April 24, 1928.

D. C. HOOKER 1,667,114

REFRIGERATING CABINET

Filed Jan. 27, 1926

Inventor

Duncan C. Hooker

By N. Ray Lindsey

His Attorney

Patented Apr. 24, 1928.

1,667,114

UNITED STATES PATENT OFFICE.

DUNCAN C. HOOKER, OF FARMINGTON, CONNECTICUT.

REFRIGERATING CABINET.

Application filed January 27, 1926. Serial No. 84,248.

This invention relates to refrigerating cabinets for the preservation and temperature maintenance of ice cream or similar food products contained therein.

Refrigerating cabinets of this sort are commonly constructed with cold wells or dry containers, so called, which form compartments to which the ice cream or other food product, the temperature of which is to be preserved, is supplied in cans or vessels of such dimensions as to be readily inserted into, and removed from, the dry containers. The dry containers, which are cylindrical in form, are permanently closed at their bottom ends and are provided with removable covers so that ready access may be had to the ice cream or other products. Inasmuch as the inner wall of the dry container is maintained below the dew point and the freezing temperature of water, it becomes coated heavily with frost and ice due to the condensation and freezing of moisture from the atmosphere which has access to the interior of the compartment whenever the cover is removed for service. Consequently, the dry container must be, and is, of considerably larger diameter than the food can, a considerable clearance being left around the food can. When the food product, such as ice cream, within the food can is relatively hard, it is difficult to scoop it out of the can, as the clearance between the can and the dry container permits the former to move and wobble about. Furthermore, since there is a space between the can and the container which is not closed, bits of ice cream fall from the scoop in handling and drop down into this space, causing an unsanitary and impure condition and a revolting appearance.

The aim of the present invention is to provide an improved arrangement wherein the above and other objections and disadvantages incident to refrigerating containers as heretofore constructed are eliminated in a very simple and effective manner. To these ends, I provide, in accordance with the present invention, a flange or shield adapted to close the upper end of the space between the container and the food can therein. With my improved arrangement, since the space between the can and the container is closed to the atmosphere, natural circulation in this space is prevented, or at least reduced, with the result that the efficiency of the refrigerating apparatus is increased and the accumulation of frost on the inside wall of the dry containers is retarded; the bits of ice cream or food products which may drop from the scoop in handling are excluded from the intervening space; and the can is steadied or supported in such manner that it cannot move about under the pressure exerted when removing the food from the can.

Other objects will be in part obvious and in part pointed out more in detail hereinafter.

The invention accordingly consists in the features of construction, combination of elements and arrangement of parts which will be exemplified in the construction hereinafter set forth, and the scope of the application of which will be indicated in the appended claims.

It is, of course, obvious that my invention is susceptible of various embodiments and modifications, it being clear that my improved flange or shield may have various forms and may be constructed of any suitable material. By way of illustration, however, I have disclosed, in the accompanying drawings, several forms which the present invention may take, and in these drawings.

Figure 1:
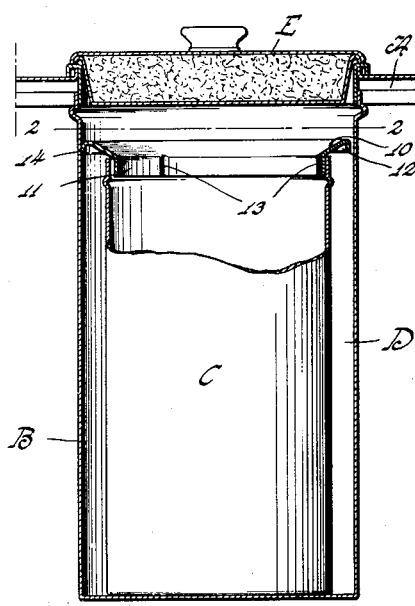
Figure 1 is a vertical sectional view through a dry container of a refrigerating cabinet to which my invention is applied, this view being taken substantially on line 1—1 of Fig. 2.

Referring to the drawings in detail, A indicates the top of a refrigerating cabinet from which is suspended a dry container B of the usual construction. The interior of the cabinet may be maintained at the desired temperature by ice or suitable refrigerating apparatus, not illustrated. C designates the usual cylindrical food can or vessel which is of such size as to provide a space D. The cover, which may be of any suitable construction, is designated by the letter E.

Figure 2:
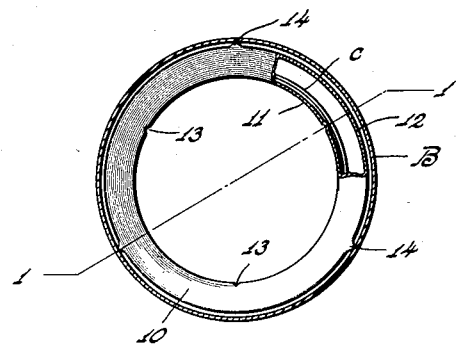
Fig. 2 is a horizontal sectional view taken substantially on line 2—2 of Fig. 1.

My improved shield or flange for closing the upper end of the space D may be in the form of a circular member 10 which, in the embodiment shown in Figs. 1 and 2 fits within the mouth of the can C and engages the inner wall of the dry container B. The flange 10 has a cylindrical rib 11 fitting within the mouth of the can C and a peripheral depending rib 12 engaging the container B. For the purposes of facilitating ready removal of the flange from the container and food can, and to prevent the flange from sticking to these elements, the ribs 11 and 12 may be respectively provided with outwardly extending projections 13 and 14 having line contacts with the food can and container respectively. The portion of the flange between the container and the can tapers downwardly and inwardly so as to conduct any food which may fall thereonto back into the food can.

It will be clear that the flange effectively closes the space D so as to obtain the objects previously stated. The flange may be readily removed from the container and can and applied to the new can when the empty can is to be replaced with a filled one.

Figure 3:
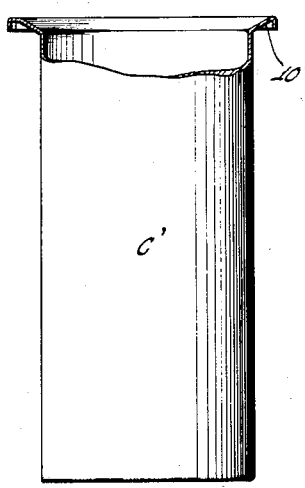
Fig. 3 is a view of a food can provided with an integral flange.

In the embodiment shown in Fig. 3, the flange 10' is formed integrally with the upper end of the food can C'.

Figure 4:
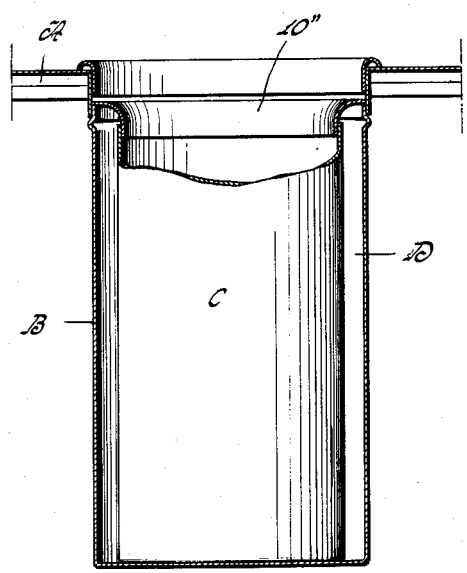
Fig. 4 is a view similar to Fig. 1, but illustrating still another embodiment of the invention.

In the embodiment shown in Fig. 4, the flange 10'' is similar to the flange 10 of the embodiment shown in Figs. 1 and 2, except that the peripheral rib 12 and the projections 13 and 14 are omitted.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In a refrigerating cabinet, a dry container, a food can within and spaced from the walls of said container, and an outwardly and upwardly tapered flange having a rib removably fitting in the mouth of said food can and a rib on its outer periphery engaging the walls of the dry container at a distance from the top thereof.

2. In a refrigerating cabinet, a dry container, a food can within and spaced from the walls of said container, and an outwardly and upwardly tapered flange having a rib removably fitting in the mouth of said food can and a rib on its outer periphery engaging the walls of the dry container, said ribs having circumferentially spaced projections respectively engaging the food can and container.

3. In combination, a refrigerating cabinet, a dry container therein, a food can within and spaced from the walls of said container, a flange for closing the space between said food can and container and for holding said can in position, said flange flaring upwardly and outwardly from the top edge of said can and having its outer periphery engaging the wall of said dry container beneath the mouth thereof, and a cover supported by said dry container and closing the mouth thereof.

4. In a refrigerating cabinet, a dry container, a food can within and spaced from the walls of said container, a flange removably fitted in the mouth of said food can and having its outer periphery engaging the walls of said dry container at a distance from the top thereof, and a cover supported by said dry container and closing the mouth thereof.

DUNCAN C. HOOKER.